(12) United States Patent
Peng et al.

(10) Patent No.: US 8,585,219 B2
(45) Date of Patent: Nov. 19, 2013

(54) PROJECTION DEVICE

(75) Inventors: Chien-Ming Peng, Hsin-Chu (TW);
I-Hsien Liu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 130 days.

(21) Appl. No.: 13/294,263

(22) Filed: Nov. 11, 2011

(65) Prior Publication Data
US 2012/0206699 A1 Aug. 16, 2012

(30) Foreign Application Priority Data
Feb. 15, 2011 (CN) .......................... 2011 1 0039390

(51) Int. Cl.
*G03B 21/14* (2006.01)
*G02B 7/02* (2006.01)
*G02B 15/14* (2006.01)

(52) U.S. Cl.
USPC ............ 353/101; 359/809; 359/823; 359/694

(58) Field of Classification Search
USPC .......... 353/100, 101; 359/809, 811, 813, 814, 359/823, 694
See application file for complete search history.

(56) References Cited

U.S. PATENT DOCUMENTS

| 7,021,773 | B2 | 4/2006 | Ishino et al. | |
|---|---|---|---|---|
| 7,744,227 | B2 | 6/2010 | Shindo et al. | |
| 8,246,178 | B2 | 8/2012 | Jeon et al. | |
| 8,289,637 | B2 * | 10/2012 | Kang et al. | 359/823 |
| 8,292,440 | B2 * | 10/2012 | Chang et al. | 353/101 |
| 8,449,124 | B2 * | 5/2013 | Tseng | 353/101 |
| 2005/0117129 | A1 | 6/2005 | Ishino | |
| 2007/0064205 | A1 | 3/2007 | Meng et al. | |
| 2007/0195292 | A1 | 8/2007 | Shindo et al. | |
| 2010/0208219 | A1 * | 8/2010 | Lee | 353/101 |
| 2010/0265475 | A1 * | 10/2010 | Jeon et al. | 353/101 |
| 2012/0229771 | A1 * | 9/2012 | Hashimoto et al. | 353/7 |

FOREIGN PATENT DOCUMENTS

| CN | 1545640 A | 11/2004 |
|---|---|---|
| CN | 101025465 A | 8/2007 |
| CN | 101261359 A | 9/2008 |
| CN | 201556016 U | 8/2010 |

OTHER PUBLICATIONS

China Patent Office, "Office Action", Jul. 30, 2013.

\* cited by examiner

*Primary Examiner* — William C Dowling
(74) *Attorney, Agent, or Firm* — WPAT, PC; Justin King

(57) ABSTRACT

A projection device including a case, a zoom lens module, a focus lever, and a linkage mechanism is provided. The case defines a guiding slot. The zoom lens module is disposed in the case and is configured for projecting an image. The focus lever is disposed in the case and is connected to the zoom lens module. The focus lever is perpendicular to a lengthening direction of a center axis of the zoom lens module. The linkage mechanism includes an adjusting rod having a connecting portion and an operating portion. The connecting portion is connected to the focus lever and is configured for rotating relative to the focus lever and moving along the lengthening direction of the focus lever. The operating portion extends out of the case and is configured for being controlled to move relative to the case along a lengthening direction of the guiding slot.

12 Claims, 8 Drawing Sheets

PROJECTION DEVICE

FIELD OF THE INVENTION

The invention relates to a projection device, and more particularly to a projection device whose focus length is adjusted by a user conveniently.

BACKGROUND OF THE INVENTION

Recently, large and heavy projection devices with cathode ray tubes (CRT) have been gradually replaced by liquid crystal display (LCD) projection devices and digital light processing (DLP) projection devices. The liquid crystal display (LCD) projection devices and the digital light processing (DLP) projection devices has advantages of lightness, thinness good portability and direct connection to a digital product for displaying an image. With the development of the projection devices, the projection devices not only are widely applied for a presentation in various fields, for example, companies, schools and other public places, but also are used to see a movie at home for an ordinary family.

Generally, a focus length of the projection device is adjusted according to a distance between a projection device and a projection screen so that an image may be displayed on the projection screen clearly. Referring to FIG. 1, a projection device 100 includes a case 110, a zoom lens module 120, and focus adjusting ring 130. The case 110 defines a light emitting opening 112 and an adjusting hole 114. The zoom lens module 120 is disposed in the case 110 and corresponds to the light emitting opening 112 so that an image may emit out of the case 110 through the light emitting opening 112.

The adjusting hole 114 of the case 110 is located above the zoom lens module 120 and is configured for exposing a portion of the focus adjusting ring 130. Accordingly, a user may adjust the focus length of the projection device 100.

Referring to FIG. 2, a user may adjust the focus length of the projection device 200 by turning the focus adjusting ring 230 exposed from the light emitting opening 212.

Additionally, the image may be enlarged in the limited distance between the projection device and the projection screen on a condition that the volume of the projection device is not increased. Referring to FIG. 3, a projection device 300 is developed. The projection device 300 further includes a reflecting component 340 disposed in front of a zoom lens module 320. The reflecting component 340 is configured for reflecting the image from the zoom lens module 320. Thus, the image may emit out and pass through a top opening (not labeled) of the case 310.

As depicted in FIG. 3, if an adjusting hole (not shown) exposing a focus adjusting ring (not shown) is disposed above the zoom lens module 320, a hand of a user for turning the focus adjusting ring will locate at a light reflecting path R of the image to block the image. Thus, the image does not be displayed on the projection screen entirely. As a result, the user can not adjust the focus length of the projection device 300 according to the definition degree of the image displayed on the projection screen. Moreover, the focus adjusting ring can not be disposed in front of the zoom lens module 340 to be turned.

SUMMARY OF THE INVENTION

Therefore, the invention is relative to a projection device. The focus length of the projection device may be adjusted by a user on a condition that an image is not blocked.

The invention provides a projection device including a case, a zoom lens module, a focus lever, and a linkage mechanism. The case defines a guiding slot. The zoom lens module is disposed in the case and is configured for projecting an image. The focus lever is disposed in the case and is connected to the zoom lens module. The focus lever is perpendicular to a lengthening direction of a center axis of the zoom lens module and is configured for adjusting a focus length of the zoom lens module. The linkage mechanism includes an adjusting rod having a connecting portion and an operating portion. The connecting portion is connected to the focus lever and is configured for rotating relative to the focus lever and moving straightly along the lengthening direction of the focus lever. The adjusting rod penetrates the guiding slot of the case so that the operating portion extends out of the case and is configured for being controlled to move linearly relative to the case along a lengthening direction of the guiding slot.

In one embodiment of the invention, the linkage mechanism further includes a pivoting component connected between the connecting portion of the adjusting rod and the operating portion of the adjusting rod and is configured for pivoting the adjusting rod with the case.

In one embodiment of the invention, the linkage mechanism further includes a protecting shell and a sliding block. The protecting shell is disposed between the zoom lens module and the case and adjacent to the guiding slot. The protecting shell defines a sliding slot, and a lengthening direction of the sliding slot is parallel to the lengthening direction of the guiding slot. The sliding block is formed on the adjusting rod and located between the connecting portion and the operating portion. The sliding block is slidably disposed in the sliding slot so as to move along the lengthening direction of the sliding slot.

In one embodiment of the invention, the sliding block is integrally formed with the adjusting rod.

In one embodiment of the invention, the focus lever defines a track slot, the connecting portion of the adjusting rod has a protrusion, and the protrusion is movably disposed in the track slot so as to move along a lengthening direction of the track slot.

In one embodiment of the invention, the protrusion is integrally formed with the adjusting rod.

In one embodiment of the invention, the connecting portion of the adjusting rod defines a track slot, the focus lever has a protrusion, and the protrusion is movably disposed in the track slot so as to move along a lengthening direction of the track slot.

In one embodiment of the invention, the protrusion is integrally formed with the focus lever.

In one embodiment of the invention, the linkage mechanism further includes a sleeve sleeved on the protrusion and located between the protrusion and the track slot.

In one embodiment of the invention, the projection device further includes a reflecting component disposed in the case and facing to the zoom lens module, and the reflecting component is configured for reflecting the image so that the image emits out of the case along a light reflecting path.

In one embodiment of the invention, the linkage mechanism is located outside the light reflecting path.

In light of the foregoing, the embodiments of the present invention may achieve at least one of following advantages or efficiencies. In the embodiments of the invention, the focus lever of the projection device is connected to the linkage mechanism that is located outside the light reflecting path of the reflecting component or outside the light path of the image. The linkage mechanism partially extends out of the case to form the operating portion of the adjusting rod. Therefore, the image of the projection device may be prevented from being blocked when the focus length of the zoom lens module of the projection device is adjusted via the operating portion of the adjusting rod of the linkage mechanism.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The above objects and advantages of the invention will become more readily apparent to those ordinarily skilled in the art after reviewing the following detailed description and accompanying drawings, in which.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
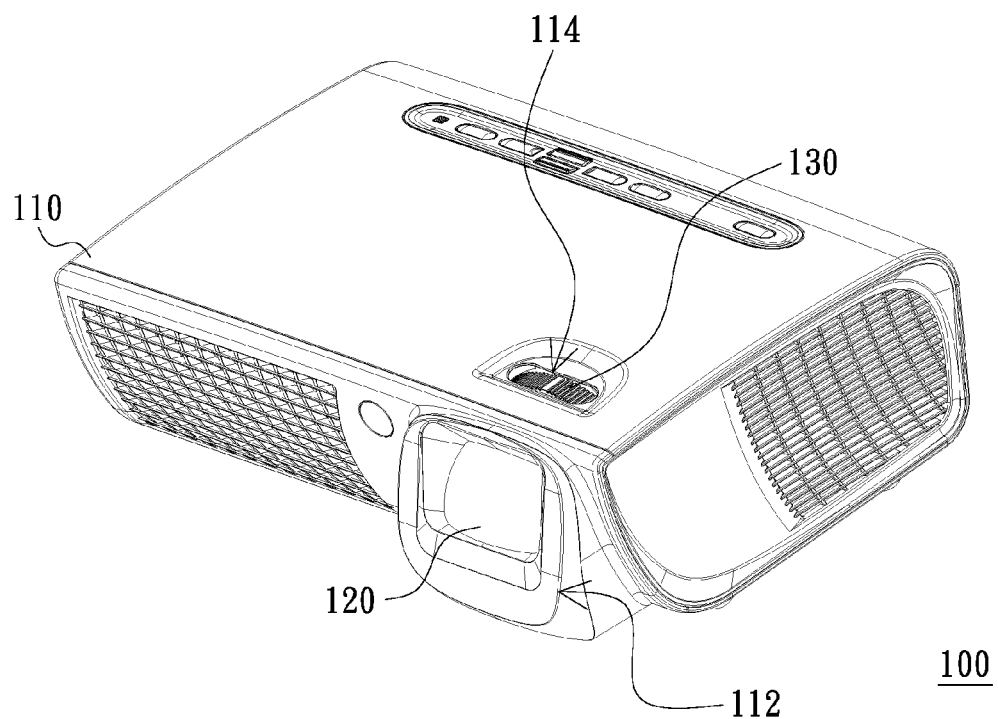
FIG. 1 illustrates a schematic, three-dimensional view of a conventional projection device.
Figure 2:
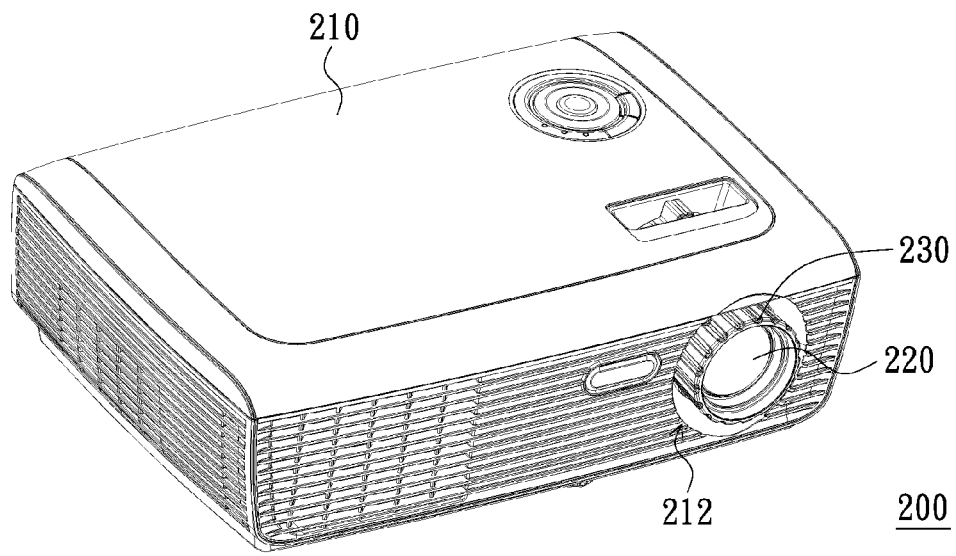
FIG. 2 illustrates a schematic, three-dimensional view of another conventional projection device.
Figure 3:
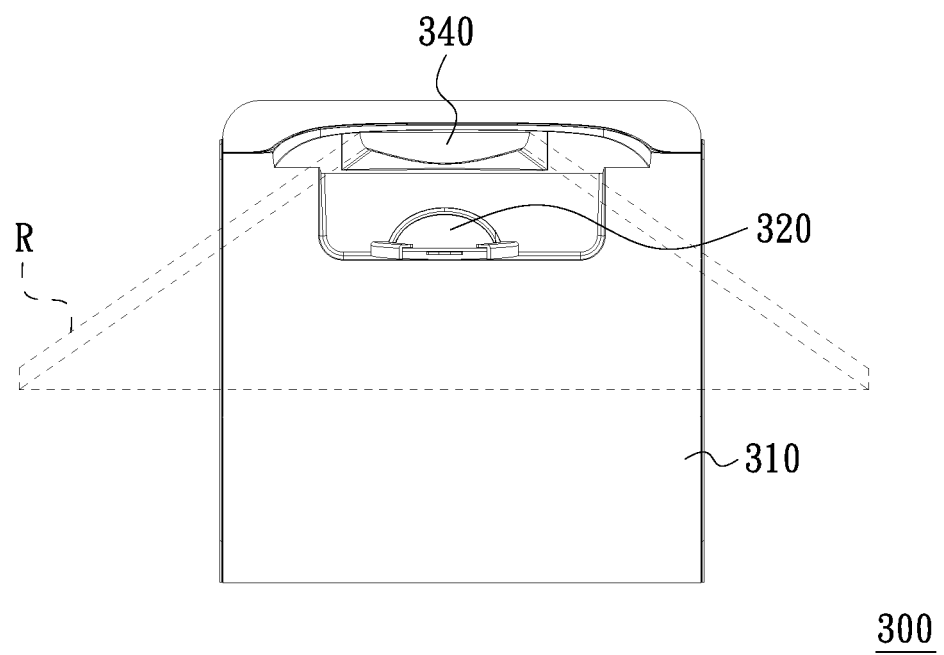
FIG. 3 illustrates a schematic, top view of another conventional projection device.
Figure 4A:
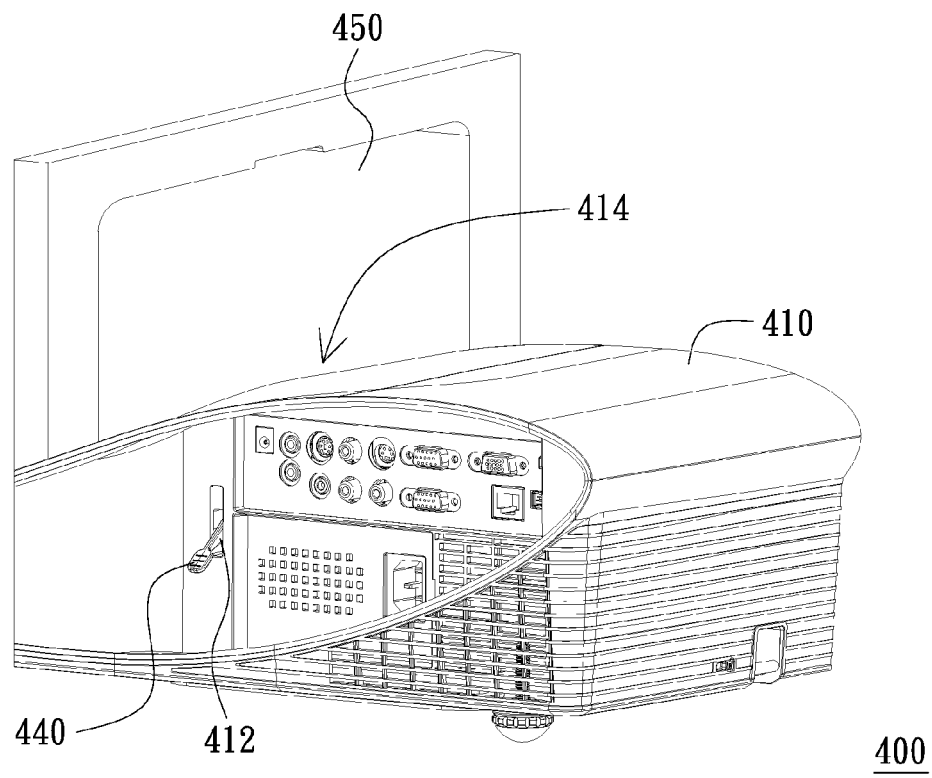
FIG. 4A illustrates a schematic, side view of a projection device in accordance with an embodiment of the invention.
Figure 4B:
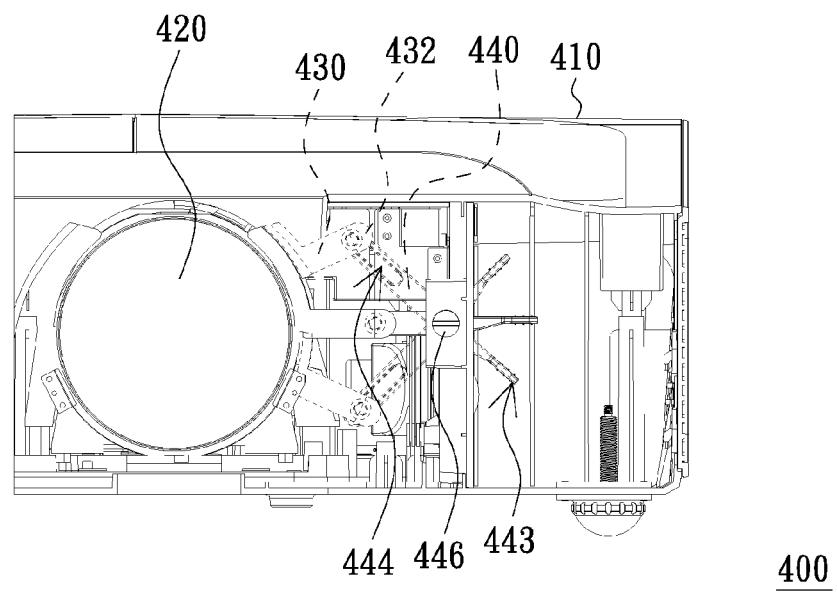
FIG. 4B illustrates a schematic, front, sectional view of the projection device shown in FIG. 4A.
Figure 4C:
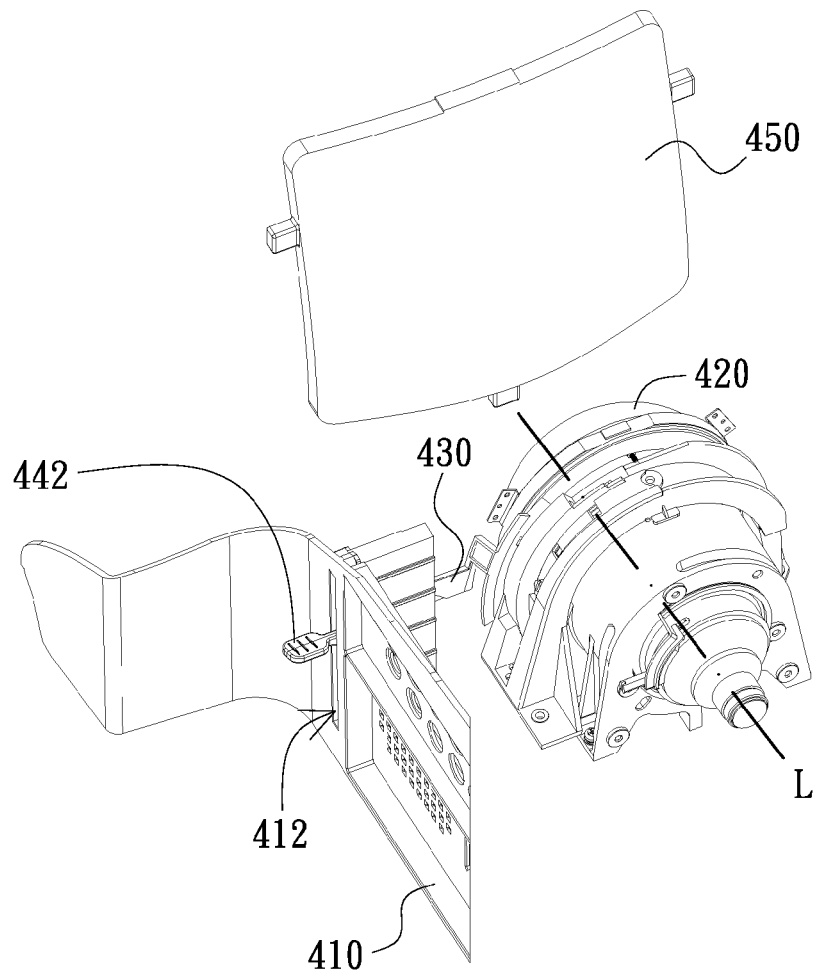
FIG. 4C illustrates a schematic, partial exploded view of the projection device shown in FIG. 4A.

Referring to FIG. 4A, FIG. 4B and FIG. 4C, a projection device 400 includes a case 410, a zoom lens module 420, a focus lever 430, and a linkage mechanism 440. The case 410 defines a guiding slot 412 and a light emitting opening 414. The zoom lens module 420 and the focus lever 430 are disposed in the case 410. The zoom lens module 420 is configured for projecting an image. In the embodiment, the projection device 400 further includes a reflecting component 450. The reflecting component 450 is disposed in the case 410 and faces to the zoom lens module 420. The reflecting component 450 is configured for reflecting the image from the zoom lens module 420 so that the image may emit out of the case 410 through the light emitting opening 414 along a light reflecting path (see the light reflecting path R shown in FIG. 3).

In the embodiment, a lengthening direction of the focus lever 430 is perpendicular to a lengthening direction L of a center axis of the zoom lens module 420 and is configured for setting and adjusting a focus length of the zoom lens module 420. For example, the zoom lens module 420 is composed of a plurality of lenses (not shown). The focus lever 430 is connected to a space mechanism (not shown) for controlling the corresponding space(s) between the plurality of lenses. Thus, when a user adjusts a position of the focus lever 430, the corresponding space(s) between the plurality of lenses of the zoom lens module 420 may be changed, thereby changing the focus length of the zoom lens module 420. In the embodiment, the space mechanism for controlling the corresponding space(s) between the plurality of lenses of the zoom lens module 420 may be a screw rod or other familiar mechanism, and is not described here.

Figure 4D:
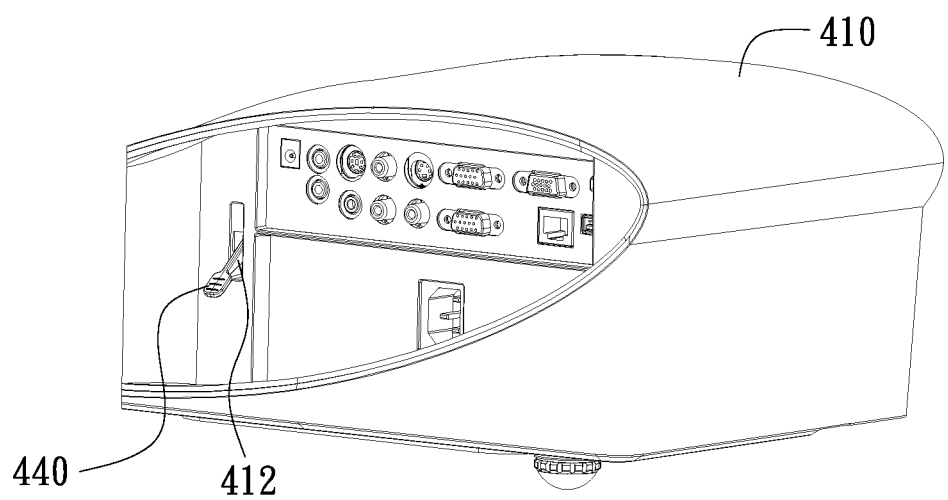
FIG. 4D illustrates a schematic, side view of a projection device in accordance with another embodiment of the invention.

It is noted that, the reflecting component 450 may be selectively disposed in the projection device 400. In other words, the reflecting component 450 may also be omitted in a projection device of the other embodiment, as shown in FIG. 4D.

Figure 5:
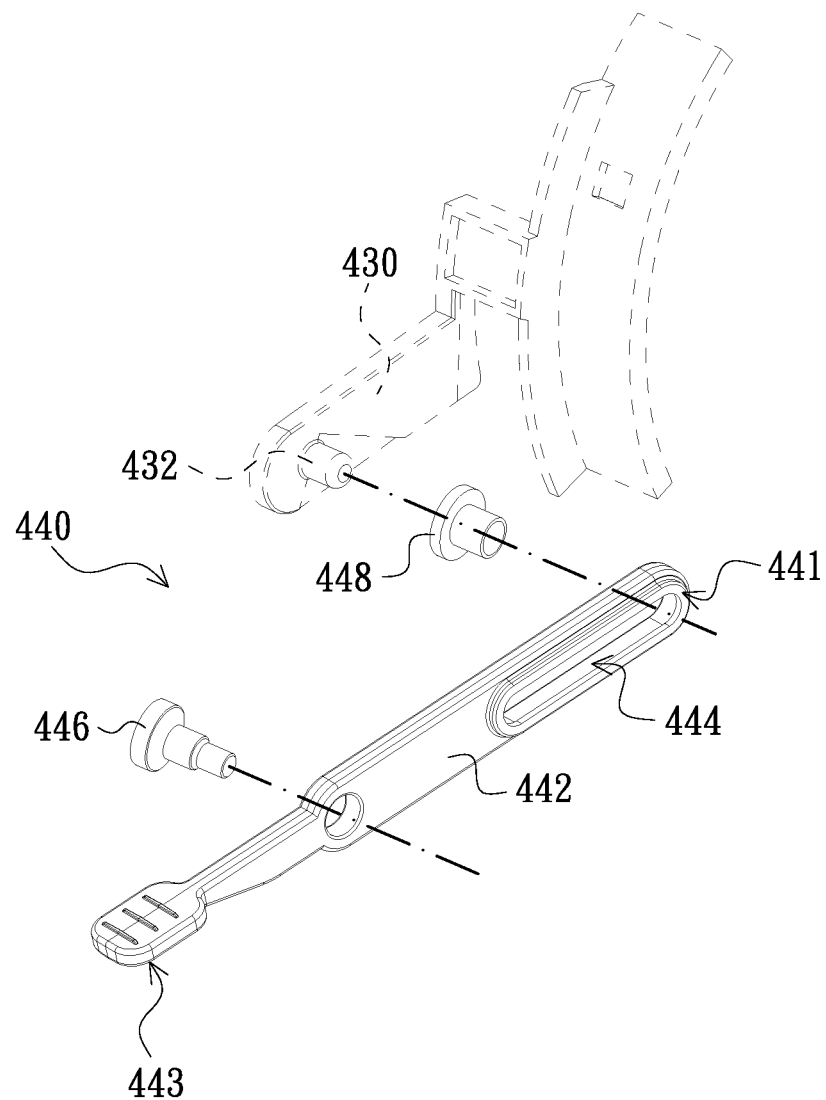
FIG. 5 illustrates a schematic, exploded view of a linkage mechanism of a projection device in accordance with an embodiment of the invention.

Referring to FIG. 4C and FIG. 5, the linkage mechanism 440 includes an adjusting rod 442. The adjusting rod 442 is located outside the light reflecting path of the reflecting component 450. That is, the adjusting rod 442 is not located on the light reflecting path of the reflecting component 450. The adjusting rod 442 has a connecting portion 441 and an operating portion 443. The connecting portion 441 of the adjusting rod 442 is connected to the focus lever 430 and is configured for rotating relative to the focus lever 430 and moving straightly along the lengthening direction of the focus lever 430. In detail, the connecting portion 441 of the adjusting rod 442 defines, for example, a track slot 444, and the focus lever 430 includes, for example, a protrusion 432. The protrusion 432 of the focus lever 430 is movably disposed in the track slot 444 of the adjusting rod 442. In detail, and the protrusion 432 may move straightly along a lengthening direction of the track slot 444. In the embodiment, the protrusion 432 of the focus lever 430 is, for example, a rivet formed by the focus lever 430 or is integrally formed with the focus lever 430. It is noted that, the protrusion 432 and the focus lever 430 may be two separated components connected each other.

The adjusting rod 442 penetrates the guiding slot 412 of the case 410 so that the operating portion 443 of the adjusting rod 442 is located outside the case 410. The operating portion 443 may be moved relative to the case 410 along a lengthening direction of the guiding slot 412. Moreover, in the embodiment, the linkage mechanism 440 further includes a pivoting component 446 connected between the connecting portion 441 of the adjusting rod 442 and the operating portion 443 of the adjusting rod 442. The pivoting component 446 is configured for pivoting the adjusting rod 442 with the case 410. For example, in the embodiment, the pivoting component 446 may be, but not limited to, a screw, a rivet or other single axis pivoting component.

Particularly, in the embodiment, a material of the focus lever 430 and the adjusting rod 442 may be, for example, metal. In detail, the focus lever 430 and the adjusting rod 442 may be made of a die-cast aluminum, which has high structural strength and good dimensional stability and is not easy to be deformed. Furthermore, in the embodiment, the linkage mechanism 440 further includes a sleeve 448 sleeved on the protrusion 432 of the focus lever 430 and located between the protrusion 432 and the track slot 444. When the focus lever 430 is cooperated with the adjusting rod 442, the sleeve 448 may protect the focus lever 430 and the adjusting rod 442 from being damaged by the impact of the focus lever 430 against the adjusting rod 442. The sleeve 448 may be made of, but not limited to, a plastic or other materials having cushion function. Thus, the sleeve 448 may cushion the collision force between the focus lever 430 and the adjusting rod 442, thereby increasing the life span of the focus lever 430 and the linkage mechanism 440.

An operation method for adjusting the focus length and a cooperation mode of the components of the projection device of the embodiments of the invention will be described as follows.

Again, referring to FIG. 4B and FIG. 5, the adjusting rod 442 of the linkage mechanism 440 is pivoted with the case 410 by the pivoting component 446, the protrusion 432 of the focus lever 430 is movably disposed in the track slot 444 of the connecting portion 441 of the adjusting rod 442, and the operating portion 443 of the adjusting rod 442 of the linkage mechanism 440 extends out of the case 410. Thus, when the user controls the operating portion 443 of the adjusting rod 442 of the linkage mechanism 440 to move up and down, the adjusting rod 442 may rotate around the pivoting component 446, thereby rotating the focus lever 430 relative to the adjusting rod 442. As a result, the focus length of the zoom lens module 420 is changed. Meanwhile, the protrusion 432 would move in the track slot 444 along the lengthening direction of the track slot 444.

As depicted in FIG. 4A to FIG. 4C, in the embodiment, the focus length of the zoom lens module 420 of the projection device 400 is adjusted by controlling the focus lever 430 via the linkage mechanism 440. Referring to FIG. 4A to FIG. 4C, the linkage mechanism 440 is located outside the light reflecting path of the reflecting component 450. Referring to FIG. 4D, the linkage mechanism 440 is located outside the light path of the image. Thus, when the focus length of the zoom lens module 420 of the projection device 400 is adjusted via the linkage mechanism 440, the image emitted from the projection device 400 may not be blocked.

Additionally, as depicted in FIG. 4B, a moving stroke of the focus lever 430 is relative to a moving stroke of the operating portion 443 and a distance between the pivoting component 446 and the connecting portion 441 of the adjusting rod 442. In addition, a linear motion of the adjusting rod 442 is designed and described in the following embodiments.

Otherwise, the projection device shown in FIG. 4D and the projection device shown in FIG. 4A are similar except that the projection device shown in FIG. 4D does not includes the reflecting component 450. The focus length of the projection device shown in FIG. 4D may be adjusted by controlling the linkage mechanism 440 so as to display the image clearly.

Figure 6A:
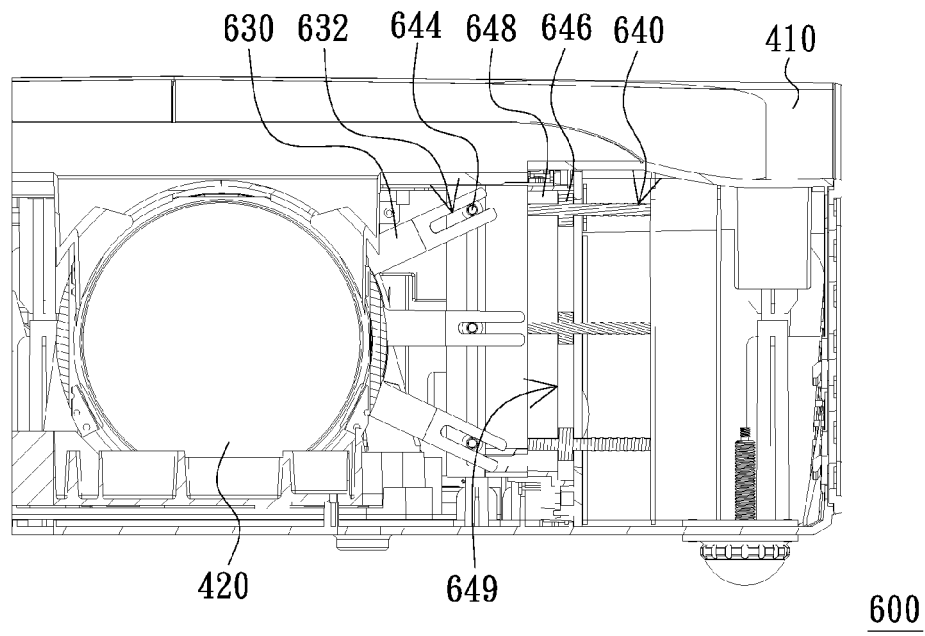
FIG. 6A illustrates a schematic, front, sectional view of the projection device in accordance with an embodiment of the invention.
Figure 6B:
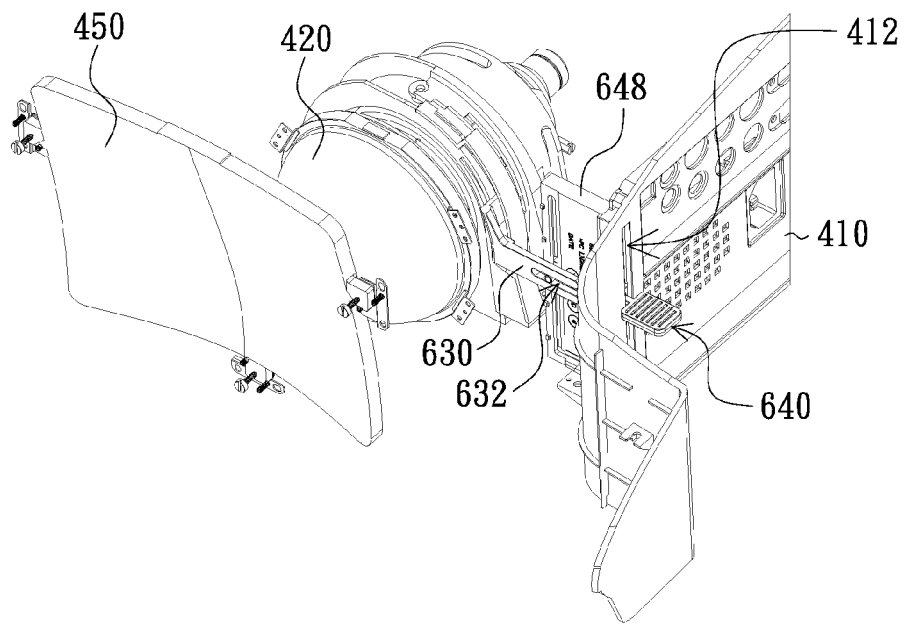
FIG. 6B illustrates a schematic, partial exploded view of the projection device shown in FIG. 6A.

FIG. 6A illustrates a schematic, front, sectional view of the projection device in accordance with an embodiment of the invention. FIG. 6B illustrates a schematic, partial exploded view of the projection device shown in FIG. 6A. It is noted that, the component of the projection device in the embodiment identical to the component of the projection device in the aforesaid embodiments has an identical numeral and are not described in detail. In the following description, only the differences are described.

Referring to FIG. 6A and FIG. 6B, in the embodiment, a projection device 600 includes a case 410, a zoom lens module 420, a focus lever 630, a linkage mechanism 640, and a reflecting component 450. The dispositions of the case 410, the zoom lens module 420, the focus lever 630, and the reflecting component 450 are similar to the projection device 400 in the aforesaid embodiments and are not described here.

Figure 7:
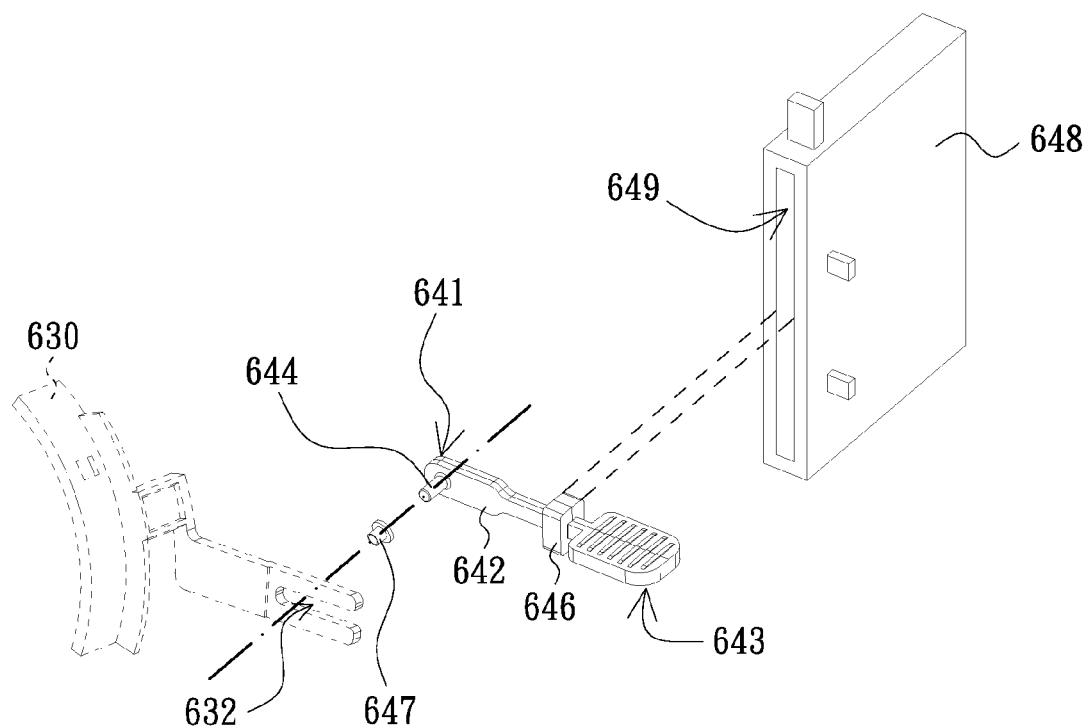
FIG. 7 illustrates a schematic, exploded view of a linkage mechanism of a projection device in accordance with an embodiment of the invention.

Referring to FIG. 6A, FIG. 6B, and FIG. 7, in the embodiment, the linkage mechanism 640 includes an adjusting rod 642, a protecting shell 648, and a sliding block 646. The adjusting rod 642 has a connecting portion 641 and an operating portion 643. The connecting portion 641 has a protrusion 644. The protecting shell 648 is disposed between the zoom lens module 420 and the case 410 and is adjacent to the guiding slot 412 of the case 410. Further, the protecting shell 648 defines a sliding slot 649. A lengthening direction of the sliding slot 649 is parallel to a lengthening direction of the guiding slot 412.

The sliding block 646 is disposed on the adjusting rod 642 and located between the connecting portion 641 and the operating portion 643. In the embodiment, the protrusion 644 and the sliding block 646 may be a die-cast aluminum integrally formed with the adjusting rod 642 or each of the protrusion 644 and the sliding block 646 may be a rivet, but the invention dose not limit thereto. The sliding block 646 is slidably disposed in the sliding slot 649 so that the sliding block 646 may slide in the sliding slot 649 along the lengthening direction of the sliding slot 649.

Additionally, in the embodiment, the focus lever 630 defines a track slot 632 thereon. The protrusion 644 of the adjusting rod 642 is slidably disposed in the track slot 632 so that the protrusion 644 may move in the track slot 632 along the lengthening direction of the track slot 632. Alternately, the protrusion 644 may be disposed on the focus lever 630 and the track slot 632 may be defined on the adjusting rod 642. That is, one of the protrusion 644 and the track slot 632 may be disposed on the focus lever 630 and another one may be disposed on the adjusting rod 642.

Particularly, in the embodiment, a material of the focus lever 630 and the adjusting rod 642 is, but not limited to, for example, metal. In the embodiment, the linkage mechanism 440 further includes a sleeve 647 sleeved on the protrusion 644 and located between the protrusion 644 and the track slot 632. When the focus lever 630 is cooperated with the adjusting rod 642, the sleeve 647 may protect the focus lever 630 and the adjusting rod 642 from being damaged by the impact of the focus lever 630 against the adjusting rod 642. The sleeve 647 may cushion the collision force between the focus lever 630 and the adjusting rod 642, thereby increasing the life span of the focus lever 630 and the linkage mechanism 640. The sleeve 647 may be made of, but not limited to, a plastic or other materials having cushion function.

As depicted in FIG. 6A, the sliding block 646 is slidably disposed in the sliding slot 649 of the protecting shell 648 and the sliding block 646 is disposed on the adjusting rod 642. Thus, a motion of the adjusting rod 642 may be a linear motion. Moreover, when the operating portion 643 of the adjusting rod 642 moves in the guiding slot 412 of the case 410 along the lengthening direction of the guiding slot 412, the sliding block 644 of the connecting portion 641 may move along the lengthening direction of the track slot 632 of the focus lever 630 and the focus lever 630 may rotate relative to the focus lever 630 under the force generated from the protrusion 644 being applying to the track slot 632. As a result, the focus length of the zoom lens module 420 is changed.

As mentioned above, in the embodiment, the focus length of the zoom lens module 420 is adjusted by controlling the adjusting rod 642 to make a linear motion relative to the case 410. A rotating stroke of the focus lever 630 relative to the adjusting rod 642 is approximately equal to a linear motion stroke of the adjusting rod 642. Thus, the user may directly know a change value of the focus length of the zoom lens module 420.

In summary, the projection device of the invention has at least the following advantages. In the embodiments, the projection device emits the image from the zoom lens module out of the case or reflects the image from the zoom lens module out of the case via the reflecting component. The focus lever is connected to the linkage mechanism, and the linkage mechanism is not located at the light reflecting path of the reflecting component or at the light path of the image. The linkage mechanism extends out of the case to form the operating portion. When the focus length of the zoom lens module of the projection device is adjusted by controlling operating portion of adjusting rod, the image emitted from the projection device may not be blocked.

Further, because the linkage mechanism of the embodiments of the invention may be modularized and be assembled in the projection device, the projection device may be assembled simply. On the other hand, the focus lever and the adjusting rod of the embodiments of the invention may be a die-cast aluminum, which has high structural strength and good dimensional stability and is not easy to be deformed comparative to the traditional process of sheet metal.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device, comprising:
   a case, having a guiding slot;
   a zoom lens module, disposed in the case and configured for projecting an image;
   a focus lever, disposed in the case and connected to the zoom lens module, the focus lever being perpendicular to a lengthening direction of a center axis of the zoom lens module and being configured for adjusting a focus length of the zoom lens module; and
   a linkage mechanism, comprising an adjusting rod, the adjusting rod having a connecting portion and a operating portion, the connecting portion being connected to the focus lever and configured for rotating relative to the focus lever and moving straightly along a lengthening direction of the focus lever, the adjusting rod penetrating a guiding slot of the case so that the operating portion extends out of the case and is configured for being controlled to move linearly relative to the case along a lengthening direction of the guiding slot.

2. The projection device of claim 1, wherein the linkage mechanism further comprises a pivoting component connected between the connecting portion of the adjusting rod and the operating portion of the adjusting rod and configured for pivoting the adjusting rod with the case.

3. The projection device of claim 1, wherein the linkage mechanism further comprises:
   a protecting shell, disposed between the zoom lens module and the case and adjacent to the guiding slot, the protecting shell defining a sliding slot, a lengthening direction of the sliding slot being parallel to the lengthening direction of the guiding slot; and
   a sliding block, formed on the adjusting rod and located between the connecting portion and the operating portion, the sliding block being slidably disposed in the sliding slot so as to move along the lengthening direction of the sliding slot.

4. The projection device of claim 3, wherein the sliding block is integrally formed with the adjusting rod.

5. The projection device of claim 1, wherein the focus lever defines a track slot, the connecting portion of the adjusting rod has a protrusion movably disposed in the track slot so as to move along a lengthening direction of the track slot.

6. The projection device of claim 5, wherein the protrusion is integrally formed with the adjusting rod.

7. The projection device of claim 5, wherein the linkage mechanism further comprises a sleeve sleeved on the protrusion and located between the protrusion and the track slot.

8. The projection device of claim 1, wherein the connecting portion of the adjusting rod defines a track slot, the focus lever has a protrusion movably disposed in the track slot so as to move along a lengthening direction of the track slot.

9. The projection device of claim 8, wherein the protrusion is integrally formed with the focus lever.

10. The projection device of claim 8, wherein the linkage mechanism further comprises a sleeve sleeved on the protrusion and located between the protrusion and the track slot.

11. The projection device of claim 1, further comprising:
a reflecting component, disposed in the case and facing to the zoom lens module, the reflecting component being configured for reflecting the image so that the image emits out of the case along a light reflecting path.

12. The projection device of claim 11, wherein the linkage mechanism is located outside the light reflecting path.

\* \* \* \* \*